R. A. JACKSON.
APPARATUS FOR TEACHING ARITHMETIC.
APPLICATION FILED FEB. 25, 1920.
1,340,052. Patented May 11, 1920.
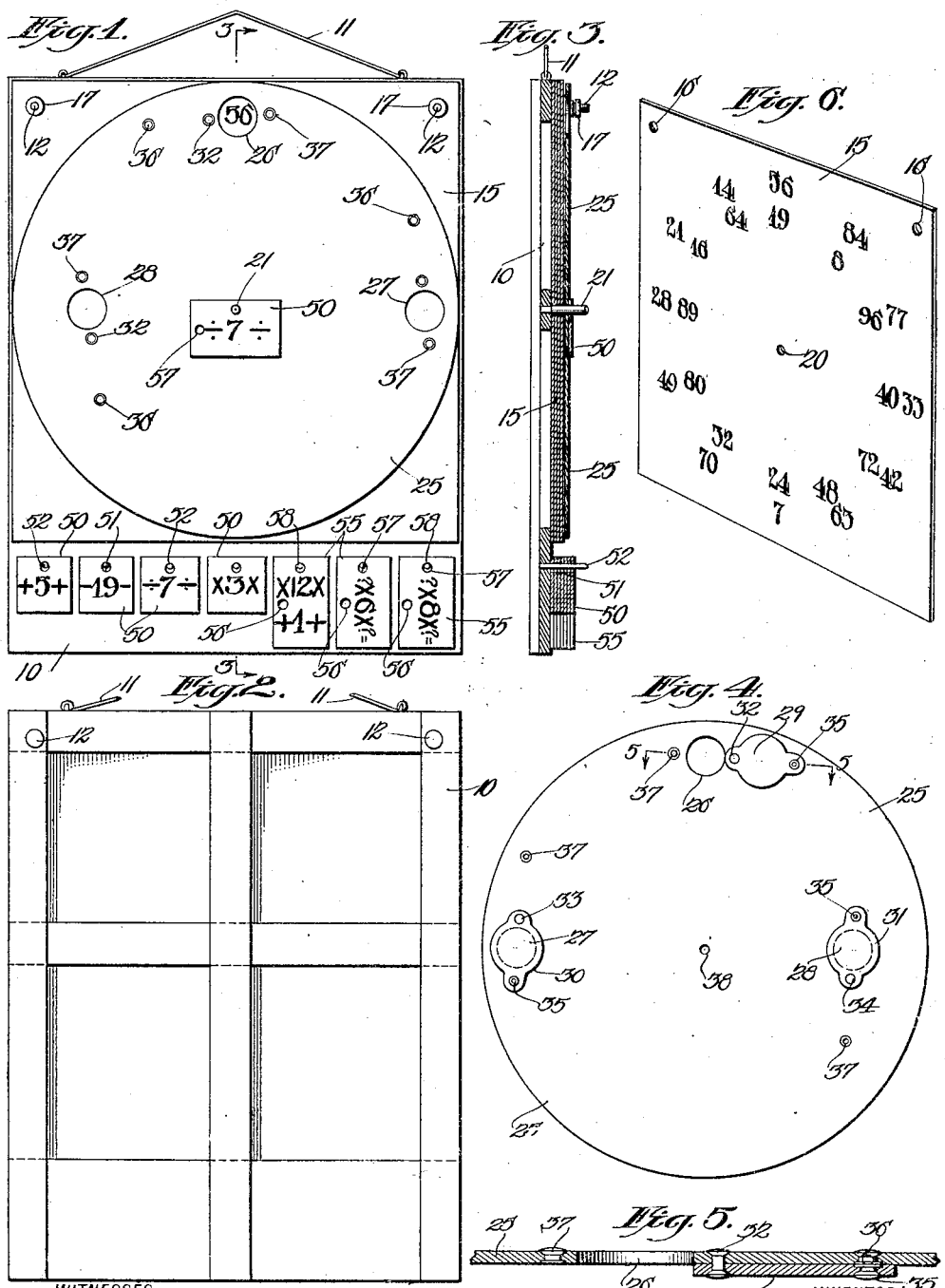
WITNESSES
INVENTOR
Roy A. Jackson.
BY
ATTORNEYS

UNITED STATES PATENT OFFICE.

ROY A. JACKSON, OF SPRINGFIELD, NEW JERSEY.

APPARATUS FOR TEACHING ARITHMETIC.

1,340,052. Specification of Letters Patent. Patented May 11, 1920.

Application filed February 25, 1920. Serial No. 361,087.

*To all whom it may concern:*

Be it known that I, ROY A. JACKSON, a citizen of the United States, and a resident of Springfield, in the county of Union and State of New Jersey, have invented a new and Improved Apparatus for Teaching Arithmetic, of which the following is a full, clear, and exact description.

The invention relates to educational appliances, and its object is to provide a new and improved apparatus for teaching arithmetic in schools and other places and arranged to enable the teacher to readily test the scholars as to speed and accuracy in solving arithmetical problems.

Another object is to provide a simple apparatus arranged to disclose a great range of arithmetical problems in addition, subtraction, multiplication and division, and to permit the teacher to quickly change from one branch to another and to vary the problems in each branch.

Another object is to facilitate progressive teaching of the aforesaid branches of arithmetic according to the advancement of the scholars in any particular class.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a front elevation of the improved apparatus for teaching arithmetic;

Fig. 2 is a rear face view of the same;

Fig. 3 is a cross section of the same on the line 3—3 of Fig. 1;

Fig. 4 is a rear face view of the revoluble display disk;

Fig. 5 is an enlarged sectional plan view of a portion of the same, the section being on the line 5—5 of Fig. 4; and Fig. 6 is a perspective view of one of the interchangeable foundation sheets.

The support 10 of the apparatus for teaching arithmetic is preferably in the form of a frame provided with a suspending means 11 for suspending the support from a nail, pin or similar means arranged on the wall of a class room in a school or other building. On the front of the support 10 and at the upper corners thereof are arranged supporting studs 12 adapted to support a plurality of superposed foundation sheets 15 made of cardboard or other suitable material, each foundation sheet 15 having openings 16 at the upper corners for engagement with the studs 12. The latter are preferably threaded and engaged by nuts 17 abutting against the outer face of the outermost foundation sheet 15 to hold the said sheets in place on the face of the support 10. Each of the foundation sheets 15 is provided on each face with numerals (see Fig. 6) which may be arranged in one circle or in two or more concentric circles, the numerals in each circle being spaced apart and the center of the circle or the concentric circles being at an aperture 20 arranged at the center of each sheet and through which projects a pivot pin 21 attached to the support 10 and projecting from the face thereof, as plainly indicated in Fig. 3. Each of the foundation sheets 15 is provided on each face with different sets of numerals, but the numerals on each face are arranged in a single circle or in a plurality of concentric circles, as previously mentioned, and each sheet 15 with a corresponding face can be moved into outermost position by correspondingly interchanging the sheets according to the problems to be solved by the scholars. Thus for beginners the face of a sheet is provided with spaced numerals, say from 0 to 9, while for more advanced scholars a sheet may be used having higher numerals, and another sheet may be used at another time having still higher numerals.

On the pivot pin 21 is mounted to turn a display disk 25 overlying the face of the outermost sheet 15, and this display disk 25 is provided with openings 26, 27 and 28, of which the openings 26 and 27 are adapted to register with and display any one of the numerals in the outermost circle on the face of the outermost foundation sheet 15. The opening 28 is adapted to register with any one of the numerals in the inner concentric circle on the outermost foundation sheet 15. The openings 26, 27 and 28 are adapted to be closed at the back by closing members 29, 30 and 31, preferably in the form of disks pivoted at 32, 33 and 34 on the back of the display disk 25 and adapted to be fastened by suitable fastening members in open or closed position on the back of the disk 25, such fastening members being preferably in the form of snap fasteners, as indicated in Fig. 5, of which a stud member 35 is mounted on the free end of the corresponding closing member 29, while two socket members 36 and 37 are mounted on the disk 25 on opposite sides of the pivot 32, 33 or 34 and equally spaced from the same. It will be noticed that by the arrangement described any one of the closing members 29, 30 or 31 can be readily moved into and locked in closed or open position relative to the corresponding openings 26, 27 and 28. The disk 25 is provided with a central opening 38 to permit of placing the disk in position on the pivot 21 or removing it therefrom whenever it is desired to change the foundation disks 15, as above explained.

On the pivot 21 are adapted to be hung cards 50 provided on each face with, at least, one numeral and one arithmetic sign, such as are used in addition, subtraction, multiplication and division. A number of cards 50 for each branch in arithmetic is provided and the sets of cards are provided with openings 51 to support any one of the cards on the pivot pin 21 or on pegs 52 arranged on the lower portion of the support 10. Additional sets of cards 55 are provided having, at least, two numerals thereon with arithmetical signs associated with each, and each of these cards 55 is provided with two apertures 56 and 57, of which the apertures 56 are adapted to engage the pivot 21 to support such card 55 from the pivot, as plainly shown in Fig. 1. The other apertures 57 are used for supporting the cards on pegs 58 arranged on the support 10 adjacent the pegs 52. It is understood that any one of the cards 50 or 55 can be removed from a corresponding peg and hung on the pivot 21. It will be noticed that the matter on the cards supported on the pivot 21 forms with the numeral displayed on the corresponding uncovered opening 26, 27 or 28 a corresponding arithmetical problem to be solved by the scholar. Thus as shown, for instance, in Fig. 1, the displayed problem for the scholar to solve is "56 divided by 7".

It is understood that by providing each foundation sheet 15 on each face with a plurality of concentric rows of numerals, comparatively few such sheets are required to encompass the whole range of arithmetical problems to be solved in conjunction with the use of the cards 50 and 55.

In using the apparatus, the nuts 17 are unscrewed from the supporting studs 12 and the foundation sheets 15 are then removed from the studs and one is selected by the teacher for use in the next lesson. The foundation sheets 15 are then replaced on the studs with the selected one at the front. The closing members 29, 30 or 31 are next adjusted to uncover the corresponding opening 26, 27 or 28 and then this disk is placed in position on the pivot 21 to be turned around thereon by the teacher to move the uncovered opening in register with any one of the numerals in the corresponding annular row of numerals on the front face of the front foundation sheet 15. The teacher selects one of the cards 50 or 55 according to the branch of arithmetic to be taught at the time and hangs such card upon the pivot 21, as shown in Fig. 1. A pupil is now called upon to answer the problems successively as they appear, on the teacher intermittently turning the disk 25. It will be noticed that by the use of the apparatus, a pupil's speed and accuracy in solving arithmetical problems can be readily ascertained.

The apparatus is sufficiently large that every one of the pupils in the class room can readily see the displayed problems and make answer from his or her seat.

Having thus described my invention, I claim as new and desire to secure by Letters Patent:—

1. An apparatus for teaching arithmetic, comprising a foundation sheet having on its face spaced numerals arranged in a circle, a revoluble display disk in front of the said foundation sheet and having its center coinciding with the center of the said circle, the disk having an opening adapted to register with and display any one of the said numerals on rotating the disk, and a card adapted to be displayed with the said disk and having produced thereon at least one numeral and at least one arithmetic sign to complete with the displayed numeral of the disk an arithmetic problem to be solved by a scholar.

2. An apparatus for teaching arithmetic, comprising a support provided with a centrally disposed pivot, a foundation sheet held on the said support and provided with spaced numerals arranged in a circle, the center of which coincides with the said pivot, the latter projecting beyond the face of the said sheet, and a card adapted to be hung on the said pivot and having produced thereon at least one numeral and at least one arithmetical sign associated with the numeral.

3. An apparatus for teaching arithmetic, comprising a support, a pivot projecting from the face of the said support, a foundation sheet removably held on the said support and provided with an opening for the said pivot to extend therethrough, the said foundation sheet having on its face spaced numerals arranged in a circle, the center of which coincides with the said pivot, a disk mounted to turn on the said pivot in front of the said foundation sheet, the said disk having a display opening adapted to register with any one of the said numerals, and a card adapted to be hung on the said pivot to support the card on the pivot, the card having produced thereon at least one numeral and one arithmetic sign.

4. An apparatus for teaching arithmetic, comprising a support, a pivot projecting from the face of the said support, a foundation sheet removably held on the said support and provided with an opening for the said pivot to extend therethrough, the said foundation sheet having on its face spaced numerals arranged in concentric circles, the center of which coincides with the said pivot, a disk adapted to be engaged with and mounted to turn on the said pivot in front of the foundation sheet, the said disk having display openings of which at least one is adapted to register with the numerals in one circle and the other is adapted to register with the numerals in the other circle of the foundation sheet, means for covering up each of the said display openings, and a card adapted to be hung on the said pivot in front of the said disk and having produced thereon at least one numeral and one arithmetic sign.

5. An apparatus for teaching arithmetic, comprising a support, a pivot projecting from the face of the said support, a foundation sheet removably held on the said support and provided with an opening for the said pivot to extend therethrough, the said foundation sheet having on its face spaced numerals arranged in concentric circles, the center of which coincides with the said pivot, a disk adapted to be engaged with and mounted to turn on the said pivot in front of the foundation sheet, the said disk having display openings of which at least one is adapted to register with the numerals in one circle and the other is adapted to register with the numerals in the other circle of the foundation sheet, means for covering up each of the said display openings, a plurality of pegs mounted on the said support and spaced from the said foundation sheet and the disk, and sets of cards hung on the said peg and each adapted to be removed and hung on the said pivot, each card having produced thereon at least one numeral and one arithmetic sign.

ROY A. JACKSON.